United States Patent Office 3,637,628
Patented Jan. 25, 1972

3,637,628
METAL NITRIDE CATALYSTS FOR PREPARING TRIAZINES AND CROSS-LINKED NITRILE POLYMERS
Edwin Dorfman, Grand Island, N.Y., and William E. Emerson, Barrington, Ill., assignors to Hooker Chemical Corporation, Niagara Falls, N.Y.
No Drawing. Continuation-in-part of application Ser. No. 634,866, May 1, 1967. This application Nov. 12, 1970, Ser. No. 89,101
Int. Cl. C08f *3/74*
U.S. Cl. 260—88.7 E     5 Claims

ABSTRACT OF THE DISCLOSURE

This invention relates (A) to a process for producing a triazine by reaction of a perfluoroalkane nitrile in the presence of a catalytic amount of a metal nitride and (B) the cross-linking of a polymer or copolymer containing at least greater than an average of one cyanohaloalkyl group on the chain of the polymer or copolymer, to form a cross-linked polymer or copolymer, in the presence of a metal nitride.

REFERENCE TO PRIOR APPLICATION

This is a continuation-in-part of copending application Ser. No. 634,866, filed May 1, 1967, now abandoned.

BACKGROUND OF THE INVENTION

This invention is directed to a novel process for production of triazine compounds. More particularly, the invention relates to a process for producing triazines from an organic nitrile such as either an aromatic or a haloalkane nitrile in the presence of at least a catalytic amount of a novel catalyst.

Prior to this invention, triazines have been produced from nitriles by the employment of a catalytic amount of particular catalysts such as metal oxides or elemental metals, or various combinations of such materials. Although varying degrees of success have been obtained by the employment of such catalysts, because there remain certain problems which have not altogether been overcome, the search for new methods of producing triazines continues. A process directed to the condensation of nitriles employing metal oxide catalysts is disclosed in applicants' copending application Ser. No. 634,848, filed May 1, 1967, and a typical patent employing combinations of ingredients which jointly have a catalytic effect sufficiently to convert a nitrile into a triazine in U.S. Pat. No. 3,095,414.

One of the problems of typical process for the conversion of a nitrile into a triazine is the conventional requirements of high temperatures. Another problem relates to the need to obtain both a high yield and a high conversion in the production of a triazine from a nitrile.

Accordingly, it is an object of this invention to provide a novel process for the production of triazine or mixtures of triazines from one or more nitriles.

Another object is a process of producing a triazine from a nitrile at a high degree of conversion and at a high degree of yield.

Another object is a process of producing a novel triazine composition.

Another object is a process which employs a novel catalyst whereby a nitrile is trimerized to form a triazine.

Another object is a process which employs a low reaction temperature in the production of a triazine from a nitrile.

Another object is a process for the production of triazines from haloalkane nitriles by the employment of a novel catalyst.

Another object is a process for cross-linking a polymer or copolymer to form a cross-linked polymer or copolymer.

Another object is a novel cross-linked polymer or copolymer composition.

Other objects become apparent from the above and following disclosure.

SUMMARY

The objects of this invention are obtained by a process comprising contacting (A) at least a catalytic amount of metal nitrile with (B) a member selected from the group consisting of (1) at least one organic nitrile, including mixtures of two or more of said organic nitrile, and (2) at least one polymer or copolymer which contains an average of at least more than one nitrile group per molecule of said polymer or copolymer, including mixtures of two or more of said polymer or copolymer, said contacting being at a temperature and for a time period sufficient to produce, respectively, a composition comprising (1) a triazine composition or (2) a cross-linked polymer or copolymer composition containing said first member.

The preceding paragraph refers to the necessity of an average of at least more than one nitrile group per molecule. This means (1) that at least one polymer or copolymer molecule contain two groups and (2) that each molecule contain at least one nitrile group. Any polymer or copolymer molecule that does not contain at least one nitrile group is not a part of those molecules upon which the average of greater than one per molecule is based; a polymer or copolymer not containing a nitrile group would constitute merely a filler material. In a like manner, the language "at least greater than an average of one cyanofluoroalkyl group per molecule" has the same meaning. Also it should be noted that the degree of cross-linking increases with a corresponding increase in the number of nitrile groups per molecule. The optimum number of nitrile groups per molecule therefore depends upon the properties desired for a particular use. Also, the optimum number of nitrile groups on the molecule depends upon the molecular weight of the polymer or copolymer employed. It should be noted that it is within the scope of this invention to employ polymers or copolymers such as triazine polymers which may be degraded by some means such as by milling, for example, to produce fragments, some of which contain the nitrile groups.

DESCRIPTION OF THE PREFERRED EMBODIMENTS

Typical metal nitrides within the scope of this invention include the nitrides of metals from any of the Periodic Table Groups I, II, III, IV, V, VI, VII, and VIII. For example, such metals typically include magnesium, calcium, copper, aluminum, titanium, tin, antimony, chromium, manganese, and iron. The preferred nitrides are those of the alkaline earth metals, of which calcium and magnesium are preferred embodiments.

The preferred nitrile is a haloalkane nitrile. Within this group is the preferred perhaloalkane nitrile preferably selected from the group consisting of perfluorooctanonitrile, trichloroacetonitrile, 4-bromohexafluorobutylronitrile and mixtures thereof, in which said triazine composition comprises tris(perfluoroheptyl) triazine, tris(trichloromethyl) triazine, tris(3-bromohexafluoropropyl) triazine, and mixtures thereof. The polymer or copolymer preferably is selected from the group consisting of perfluoroalkylenetriazine polymers and copolymers, perfluoroalkylene ether polymers, perfluoropropylene-vinylidene fluoride copolymers fluoroalkyl silicone polymers, tetrafluoro-ethylene-nitrosotrifluoromethane copolymers, each of which contains at least greater than an average of one cyanoperfluoroalkyl group per molecule, and mixtures thereof.

An aspect of this invention resides in the employment of a novel catalyst as defined above. It has unexpectedly been discovered that by the employment of the catalyst of this invention, one or more of the above objects are thereby obtained, depending upon the particular catalyst employed. Moreover, it has been discovered unexpectedly that by the employment of certain of the preferred catalysts of this invention, the reaction of our invention takes place at unexpectedly low temperatures. The novel catalyst-containing polymer or copolymer compositions of this invention exhibit novel properties different from corresponding polymer or copolymer compositions produced by other methods. The particular properties depend upon which catalyst of this invention is employed.

The novel process of this invention includes the steps of curing a polymer or copolymer in which each of at least greater than an average of one of said nitrile groups is a part of a cyanohaloalkyl group in the presence of the above described catalyst. The curing is at a sufficiently elevated temperature and a period sufficiently long and in the presence of a sufficient number of polymer cyanohaloalkyl groups, to cross-link (vulcanize) to form a cross-linked polymer or a cross-linked copolymer. The process may employ any polymeric composition having at least greater than an average of one cyanohaloalkyl groups per molecule in the presence of a catalytic amount of the catalyst of this invention to cross-link to form a cross-linked polymer or copolymer of this invention. The polymers and copolymers of the novel curing process exhibit novel properties different from what might appear to be corresponding cross-linked polymers and copolymers produced by other methods. The particular properties depend upon which catalyst of this invention is employed. For example, a novel use of the polymer composition of this invention is the employment as a sealant for high temperature use, and it may be cured in situ.

The organic nitrile which may be employed as the beginning reactant in this invention generally includes any conventional organic nitrile such as those disclosed in U.S. Pat. No. 3,095,414 and copending application U.S. Ser. No. 634,848. Accordingly, organic nitriles listed in the above patent such as:

2-methylbenzonitrile;
3-ethylbenzonitrile;
4-butylbenzonitrile;
3-nitrobenzonitrile;
2-ethyl-4-nitrobenzonitrile;
2,4-dimethylbenzonitrile;
2,6-dimethylbenzonitrile;
2-ethyl-3,4,5-trimethylbenzonitrile;
1-napthonitrile;
2-naphthonitrile;
3-methyl-1-napthonitrile;
1-cyanoanthracene;
2-cyanoanthracene;
trichloroacetonitrile;
trimethylacetonitrile;
tribromoacetonitrile;
2,2-dichloropropionitrile;
2,2-diiodopropionitrile;
2-iodo-2-methylvaleronitrile;
2,2-difluoro-1-decyl cyanide, and the like may be employed. Similarly, organic nitriles of the above-cited copending application which are typical beginning reactants for this invention include:

perfluorobutyronitrile;
difluoroacetonitrile;
difluorochloroacetonitrile;
perfluoroglutaronitrile;
perfluorosuccinonitrile;
trifluoroacetonitrile;
pentafluoropropionitrile;
perfluoromalononitrile;
bromotetrafluoropropionitrile;
bromooctafluorovaleronitrile;
nonofluoro-3-thiabutyronitrile;
perfluoroethyladiponitrile;
perfluorosuberonitrile;
perfluorosebaconitrile;
perfluorovaleronitrile;
bromodifluoroacetonitrile;
perfluoroadiponitrile;
perfluorotetradecane dinitrile;
perfluoromethoxypropionitrile;
perfluoroethoxypropionitrile;
perfluorocapronitrile;
3,4-dibromopentafluorobutyronitrile;
trifluoromethylbenzonitrile;
chlorobenzonitrile;
dichlorobenzonitrile;
polychlorobenzonitriles;
perfluorododecane-nitrile;
perfluorotetradecane nitrile;
perfluorostearonitrile;
benzonitrile;
2-nitro-4-trifluoromethylbenzonitrile;
perfluorooleonitrile;
m-(trifluoromethylbenzoyl)-benzonitrile;
2-phenyl-2,4,4,4-tetrafluoroacetonitrile;
perfluorobenzonitrile,
nitriles of the formula:

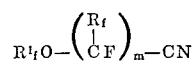

wherein $m$ is one or more, wherein $R^1_f$ is lower perfluoroalkyl and $R_f$ is selected from the group consisting of fluorine and perfluoroalkyl of from 1 to 12 carbon atoms, such as:

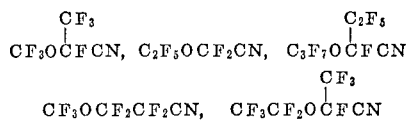

and the like; nitriles of the formula:

$$T(R_f'')O(CF_2)_nCN$$

wherein T is selected from the group consisting of hydrogen and halogen, $R_f''$ is perfluoroalkylene of 1 to 12 carbon atoms, and $n$ is from 1 to 10, such as:

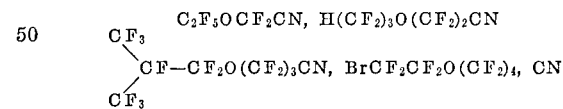

perfluoroisobutyloxypropionitrile, perfluorohexyloxypropionitrile, perfluorocytyloxypropionitrile, and the like, and mixtures of the aforementioned nitriles. It is to be understood that the above-listed organic nitriles are not all inclusive, but are merely intended to illustrate some of the compounds which are contemplated for purposes of this invention.

As noted above, the haloalkane nitriles are the preferred reactants for this invention. These nitriles are characteristically trimerized at 190 degrees centrigrade or less, in twenty or less hours. Within this group, preferred embodiments are those haloalkane nitriles having at least one fluoro substituent, and secondly, those haloalkane nitriles having at least two halo substituents. A third preferred embodiment is a haloalkane nitrile which contains at least two fluorosubstituents. Typical examples of these various preferred embodiments include:

perfluorobutyronitrile,
perfluorosuberonitrile,
perfluorosebaconitrile,
perfluorovaleronitrile, perfluorotetradecane dinitrile,
perfluoroethoxypropionitrile,
difluoroacetonitrile,
trifluoroacetonitrile,
pentafluoropropionitrile,
bromotetrafluoropropionitrile,
bromooctafluorovaleronitrile,
nonofluoro-3-thiabutyronitrile,
monofluoroacetonitrile,
trichloroacetonitrile,
and the like.

In order to bring about the trimerization reaction, it is merely necessary that the amount of catalyst be sufficient, based on percentage by weight of the nitrile employed to initiate and maintain a trimerization reaction. Except for practical purposes, there is no known maximum amount. However, because the catalyst normally would have to be removed from the reaction product, i.e., separated therefrom, it normally would be desirable to employ as little catalyst as necessary to accomplish the desired result. There would rarely be any need to employ higher than 10 percent of catalyst, based on the weight of the nitrile employed. The minimum amount of catalyst found to be normally necessary is at least about 0.01 percent by weight. The preferred percentage range is from about 0.05 percent to about 10 percent by weight.

The nitrile trimerization reaction can be run in any solvent which does not adversely react with the nitrile, the catalyst, or the reaction products of the nitrile and catalyst. Suitable solvents include, e.g., n-butyl acetate, carbon tetrachloride, ortho-chlorotoluene, chlorobenzene, nitrobenzene, cyclohexanone, ortho-dichlorobenzene, diethylcarbitol, dimethylsulfoxide, dioxane, ethyl acetate, and the like. This list is merely illustrative, and does not purport to describe the vast number of solvents which can be used in the process of this invention. Similarly, such solvents may be employed with the polymer or copolymer composition (mixture) of this invention, for uses such as paints, sealants, and coatings.

The process of this invention is normally operable at a temperature of from zero to about 400 degrees centigrade, though it is preferably practiced in the zero degree centigrade to about 250 degrees centigrade range depending upon the particular catalyst employed, more preferably above about 15 degrees centigrade, including a preferred trimerization temperature of from about 100° C. to about 200° C., and including a curing temperature up to preferably about 190 degrees centigrade for the polymer or copolymer. Although it is normally desirable that the temperature employed be near room temperature if a good yield and conversion can be obtained, it is solely by the employment of particular preferred embodiments of this invention that it is possible to produce satisfactory yields at this low temperature for example.

The reaction time is typically dependent on several factors such as the particular catalyst employed, the amount of catalyst employed, the temperature at which the reaction is carried out, and the degree of conversion desired, for example. A reaction time of from about two hours up to about seven days is normally satisfactory.

The degree of cross-linking for polymers and copolymers of this invention has been found to depend on the number of cyanohaloalkyl groups along the polymer chain, the amount of catalyst used, and on the time and the temperature range which is used in the curing process of the polymer. The polymers which have been cross-linked by this method have been perfluoroalkylene triazine polymers of a wide range of molecular weight.

Lower molecular weight perfluoroalkylene triazine polymers which have nitrile groups only at the polymer chain ends have been cured catalytically. Perfluoroalkylene triazine polymers which have cyanoperfluoroalkyl groups at the 6 position of the triazine ring have also been successfully cured. The percentage of cyanoperfluoroalkyl groups at the 6 position of the triazine ring on these polymer chains may vary from less than 1 percent up to 100 percent. A preferred percentage is from about 3 percent to 20 percent of nitrile-containing groups in the 6 position of the triazine ring.

Perfluoroalkylene triazine polymers have been described in our copending application U.S. Ser. No. 533,430, filed Mar. 11, 1966, which disclosure is hereby incorporated by reference.

Other fluorine-containing polymers such as the tetrafluoroethylene trifluoronitrosomethane copolymers can also be cured by these catalytic curing processes, provided they contain the nitrile groups as set forth hereinabove. Perfluoroalkylene ether polymers, perfluoropropylenevinylidene fluoride copolymers, fluoroalkyl silicone polymers and the like, containing the disclosed nitrile groups also can be cured by this catalyst.

The triazine and cross-linked polymer or copolymer products produced by this invention are typically useful in applications requiring high-temperature stability and chemical stability. The specific triazines produced by this invention are useful both as high temperature lubricants and solvents, whereas the polymer or copolymer produced when a dinitrile is condensed is useful in preparing highly heat-resistant molded articles.

The following examples are not intended to limit the invention disclosed, but rather to illustrate it. All percentages are based on percent of theory unless otherwise stated. All parts are by weight and temperatures are given in degrees centigrade unless indicated otherwise.

EXAMPLE 1

Perfluorooctanonitrile, 3.56 parts, and calcium nitride, 0.13 part were heated at 190° C. for 20 hours in a sealed tube. A 1% conversion to tris-(perfluoroheptyl)-triazine was obtained as determined by infrared.

EXAMPLE 2

Similarly, following the procedure of Example 1, magnesium nitride gave triazine in 2% conversion.

EXAMPLES 3 and 4

A perfluoroalkylenetriazine polymer containing from one to 20 cyanoperfluoropropyl groups for every 99 to 80 perfluoropropyl groups respectively in the polymer chain is mixed with 5 percent by weight of catalyst (1 gram polymer per 0.05 gram catalyst) as shown in the following table. The mixtures are then heated at the temperatures shown and for the periods of time indicated to produce cross-linked polymers as indicated by the fact the resulting products are insoluble in hexafluoroxylene.

| Example No. | Catalyst | Temperature (° C.) | Time (hours) |
|---|---|---|---|
| 3 | Calcium nitride | 190 | 20 |
| 4 | Magnesium nitride | 190 | 20 |

It is to be understood that the specification, including the examples, are only illustrative of the invention claimed herein, and that it is within the scope of this invention to employ equivalents obvious to one skilled in the art.

We claim:
1. A process for preparing a cross-linked polymer or copolymer composition which comprises reacting at least one perfluoroalkylene triazine polymer or copolymer which contains at least one polymer or copolymer molecule containing two nitrile groups and wherein each molecule contains at least one nitrile group, in the presence of a catalytic amount of a metal nitride, at a reaction temperature of about 0 to 400 degrees centigrade.

2. The process of claim 1 wherein the catalyst is an alkaline earth metal nitride, wherein the reaction temperature is from about 25 to about 190 degrees centigrade, and wherein each nitrile group is part of a cyanohaloalkyl group.

3. The process according to claim 2 wherein the alkylene groups of the cyanohaloalkyl groups are each selected from the group consisting of methylene, ethylene, propylene, butylene, pentylene, hexylene, heptylene, octylene, nonylene and decylene.

4. The process according to claim 3 wherein the catalyst is calcium nitride.

5. The process according to claim 3 wherein the catalyst is magnesium nitride.

References Cited

UNITED STATES PATENTS

| | | | |
|---|---|---|---|
| 3,542,660 | 11/1970 | Gundahl | 260—248 X |
| 3,470,176 | 9/1969 | Zollenger | 260—248 |
| 3,369,002 | 2/1968 | Griffin | 260—78.4 |
| 3,060,179 | 10/1962 | Toland | 260—248 |

MORRIS LIEBMAN, Primary Examiner

R. ZAITLEN, Assistant Examiner

U.S. Cl. X.R.

252—438; 260 2 M, 37 N, 248 CS